United States Patent
Goossens et al.

(10) Patent No.: US 9,133,903 B2
(45) Date of Patent: Sep. 15, 2015

(54) HYDROELASTIC FLUIDS FOR FLUID FILLED ELASTOMERIC DAMPING DEVICES

(71) Applicant: The Pullman Company, Milan, OH (US)

(72) Inventors: Joshua R. Goossens, Norwalk, OH (US); Zoren E. Gaspar, Huron, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 14/021,164

(22) Filed: Sep. 9, 2013

(65) Prior Publication Data

US 2014/0265074 A1    Sep. 18, 2014

Related U.S. Application Data

(60) Provisional application No. 61/786,675, filed on Mar. 15, 2013.

(51) Int. Cl.
*F16F 13/00* (2006.01)
*F16F 13/08* (2006.01)

(52) U.S. Cl.
CPC ............. *F16F 13/08* (2013.01); *F16F 2224/04* (2013.01)

(58) Field of Classification Search
USPC ......... 267/140.11–140.15, 140.2–141.7, 220, 267/293; 248/550, 562, 566
See application file for complete search history.

(56) References Cited

U.S. PATENT DOCUMENTS

| | | | | |
|---|---|---|---|---|
| 4,236,607 A | * | 12/1980 | Halwes et al. | 188/379 |
| 4,733,758 A | * | 3/1988 | Duclos et al. | 188/267.1 |
| 5,595,374 A | * | 1/1997 | Charette et al. | 267/220 |
| 6,698,731 B2 | | 3/2004 | Thornhill | |
| 7,584,944 B2 | | 9/2009 | Goudie | |
| 7,637,486 B2 | * | 12/2009 | Goudie | 267/140.13 |
| 7,922,156 B2 | | 4/2011 | Goudie | |
| 8,038,132 B2 | | 10/2011 | Thornhill et al. | |
| 8,177,201 B2 | | 5/2012 | Goudie | |
| 8,231,115 B2 | | 7/2012 | Goudie et al. | |
| 2005/0121269 A1 | | 6/2005 | Namuduri | |
| 2009/0194921 A1 | * | 8/2009 | Smith et al. | 267/141.1 |
| 2011/0277252 A1 | | 11/2011 | Stubler et al. | |

FOREIGN PATENT DOCUMENTS

JP    10-267069    10/1998
JP    2009-252873    10/2009

OTHER PUBLICATIONS

Search Report and Written Opinion dated Jun. 20, 2014 in corresponding PCT Application No. PCT/US2014/020686 (11 pages).

* cited by examiner

*Primary Examiner* — Christopher Schwartz
(74) *Attorney, Agent, or Firm* — Harness, Dickey & Pierce, P.L.C.

(57) ABSTRACT

A vibration damping device has a first support member and a second support member. A first component and a second component are disposed between the first support member and the second support member to define a first fluid chamber and a second fluid chamber. A channel extends between the first and second chambers. During compression and extension of the vibration damping device, fluid transfers between the first and second chamber to provide a damping force for the vibration damping device. The fluid within the chambers of the vibration damping device has a fluid density in the range of 1.25 g/cm³ to 2.2 g/cm³, a fluid viscosity below 10 cSt @ 20° C. and a fluid surface tension below 40 dynes @ 20° C.

20 Claims, 6 Drawing Sheets

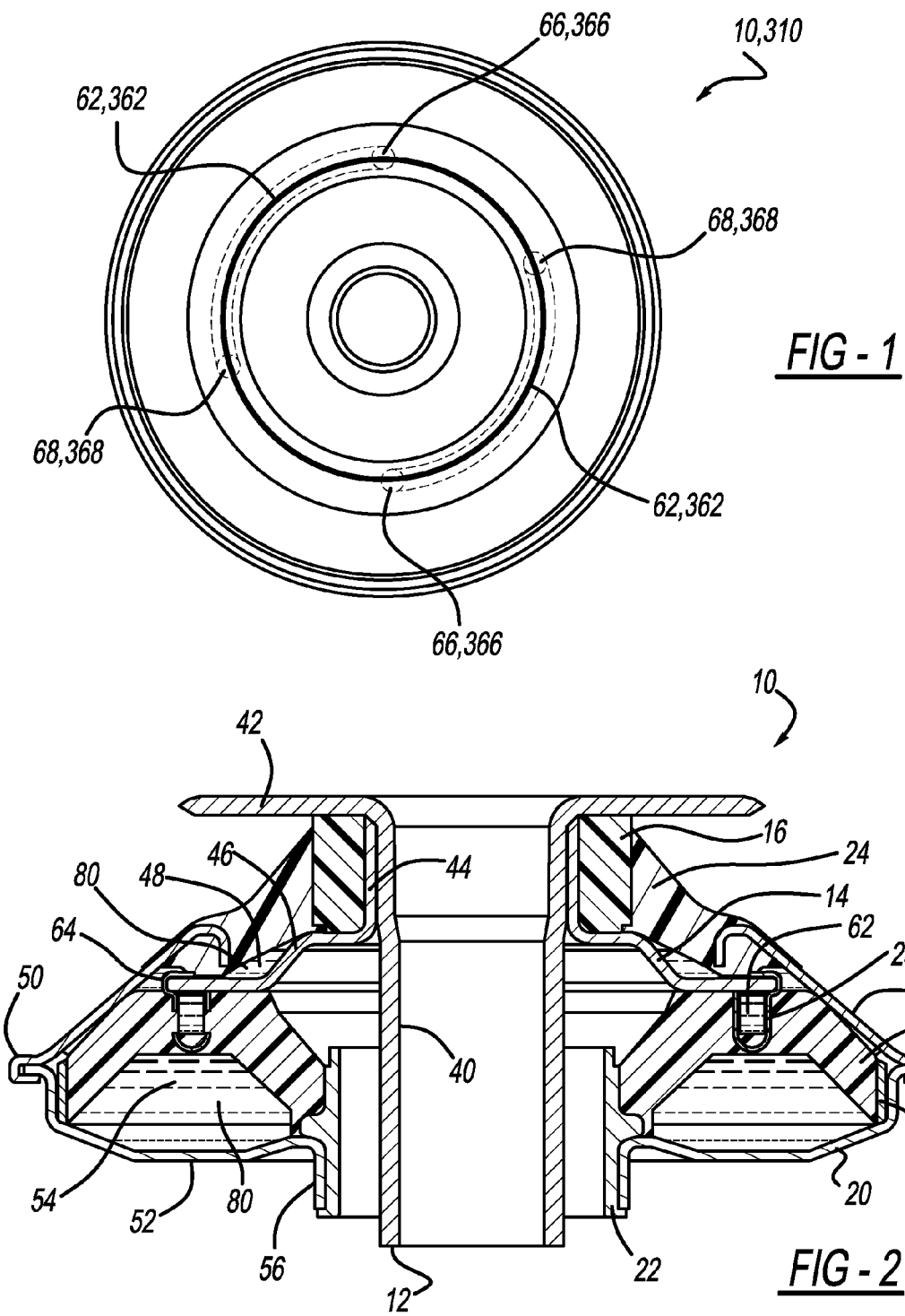

HYDROELASTIC FLUIDS FOR FLUID FILLED ELASTOMERIC DAMPING DEVICES

CROSS-REFERENCE TO RELATED APPLICATIONS

This application claims the benefit of U.S. Provisional Application No. 61/786,675, filed on Mar. 15, 2013. The entire disclosure of the above application is incorporated herein by reference.

FIELD

The present disclosure relates to fluid filled suspension bushings, fluid filled body mounts, fluid filled sub-frame mounts, fluid filled engine mounts or other similar type fluid filled mounting systems. More particularly, the present disclosure relates to hydroelastic fluids for the various fluid filled mounting systems.

BACKGROUND

The statements in this section merely provide background information related to the present disclosure and may not constitute prior art.

Fluid filled vibration damping devices are utilized for automotive engine mounts, subframe mounts and body mounts. These vibration damping devices couple two components together while damping the vibrations between the components. Typically there is an upper portion and a lower portion precompressed against each other prior to the working load being applied to the mounting system.

Current fluid filled elastomeric damping devices such as suspension bushings, body mounts, engine mounts and subframe mounts typically use glycol or glycol water solutions as the fluid of choice. Common fluids used in this category of vibration damping devices are 50% ethylene glycol/50% water or 50% propylene glycol/50% water mixtures.

Current industry trends are to use propylene glycol mixtures due to the lower toxicity concerns with propylene glycol over ethylene glycol. Any of the simple diols that are fully soluble with water are appropriate fluids to choose from. These include ethylene glycol, propylene glycol, di-proylene glycol and tri-propylene glycol. Other more complicated chemical structure glycols could be used in their pure forms or at mixture ratios that support full solubility with water over a temperature range of −40° C. to 105° C.

The main disadvantage of these solutions are their densities being in the range of 1.0 g/cm$^3$ to 1.1 g/cm$^3$ and their viscosity profile over the temperature range indicated above.

Fluid filled vibration damping elastomeric devices of the type listed above work on the principle of resonant masses. These devices have internal geometric fluid flow pathways that allow a mass of fluid to go into a natural resonance based on the geometric shape of the fluid pathway, the fluid density, the fluid viscosity and the fluid surface tension. The fluids used also have to have a freezing point below −40° C. and a boiling point above 105° C. to meet the targeted end use applications encountered in the transportation vehicle industry.

Improved fluid filled vibration damping devices could be built if alternative fluid having improved properties when compared with the current state of art fluids were used.

SUMMARY

The present disclosure provides the art with a hydraulic vibration damping device which includes two chambers and an interconnecting channel extending between the two channels. The axial damping of the vibration damping device is achieved by the resonance of the mass of the fluid in the connecting channel. The tuning for the vibration damping device is accomplished by adjusting the length and cross-sectional area of the connecting channel as well as selecting a fluid with improved properties. The present disclosure also provides for radial damping of the vibration damping device using two chambers and an interconnecting channel in one embodiment and a frictional system in another embodiment.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a top plan view of the vibration damping device in accordance with the present disclosure;

FIG. 2 is a side cross-sectional view of the vibration damping device illustrated in FIG. 1 in a free state;

DETAILED DESCRIPTION

Figure 3:
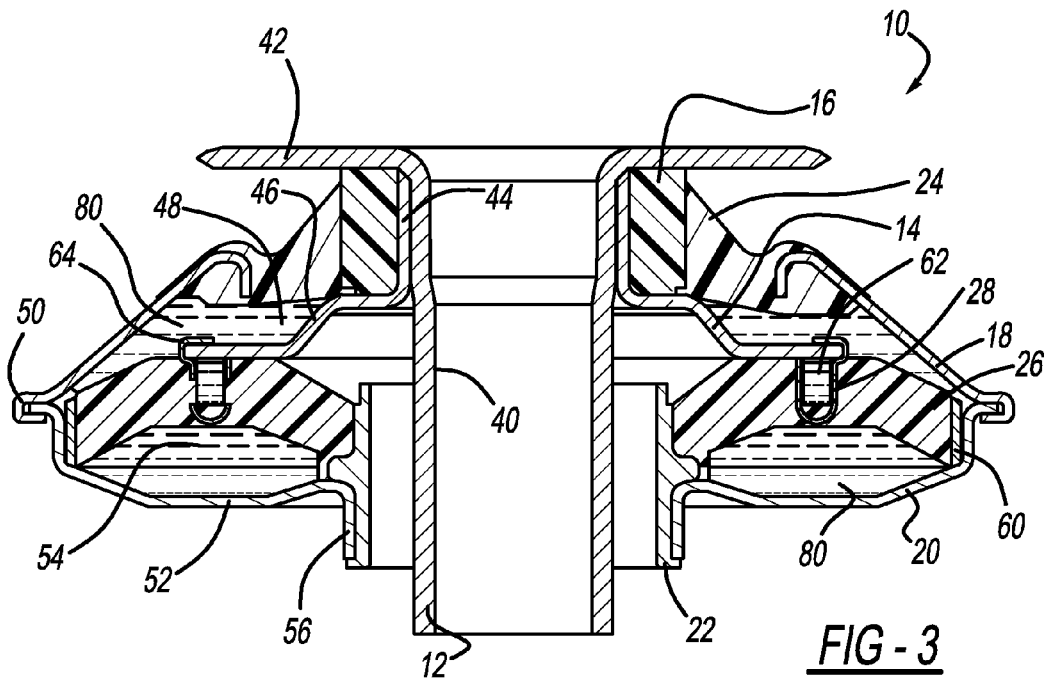
FIG. 3 is a side cross-sectional view of the vibration damping device illustrated in FIG. 1 in a compressed state.

The following description is merely exemplary in nature and is not intended to limit the present disclosure, application, or uses. There is illustrated in FIGS. 1-3 a vibration damping device in accordance with the present disclosure which is indicated generally by the reference numeral 10. Vibration damping device 10 comprises an inner tube 12, an annular connector 14, and inner ring 16, an upper cup 18, a bottom cup 20, an outer tube 22, a first component illustrated as an upper elastomeric spring 24, a second component illustrated as a lower elastomeric spring 26 and a channel retainer 28.

Inner tube 12 comprises a cylindrical portion 40 and an annular flange 42. The upper surface of annular flange 42 engages and supports the upper component such as the engine, the vehicle body or the subframe being mounted to the lower component such as the frame or chassis of the vehicle. Cylindrical portion 40 is adapted to receive a mounting bolt for the bolt-through design for vibration damping device 10.

Annular connector 14 comprises a cylindrical portion 44 which engages cylindrical portion 40 of inner tube 12 and an annular portion 46 which forms a portion of a first chamber illustrated as a sealed upper chamber 48 as discussed below. Inner ring 16 is disposed around cylindrical portion 44 of annular connector 14 and is disposed between annular flange 42 of inner tube 12 and annular portion 46 of annular connector 14. Inner ring 16 helps to transfer the load of the upper component from inner tube 12 to annular connector 14 as discussed below. Inner tube 12, annular connector 14 and inner ring 16 define a first support member for the upper component.

Upper cup 18 is an annular member which encircles annular connector 14 to also form a portion of sealed upper chamber 48. Upper elastomeric spring 24 is bonded to the upper support member by being bonded to both inner ring 16 and upper cup 18 to complete the formation of sealed upper chamber 48. Upper cup 18 includes an attachment flange 50 which is formed around bottom cup 20 during the assembly of vibration damping device 10. Bottom cup 20 comprises an annular portion 52 which forms a portion of a second chamber illustrated as a sealed lower chamber 54 and a cylindrical portion 56 which engages outer tube 22. The lower surface of bottom cup 20 engages and supports the lower component to which the upper component is being attached. The lower end of outer tube 22 is formed over cylindrical portion 56 of bottom cup 20 during the assembly of vibration damping device 10. Upper cup 18, bottom cup 20 and outer tube 22 define a second support member for the lower component.

Lower elastomeric spring 26 is bonded to the lower support member by being bonded to outer tube 22 and is also bonded to a retention ring 60 which engages bottom cup 20. Lower elastomeric spring 26 completes the formation of sealed lower chamber 54. Lower elastomeric spring 26 defines one or more fluid channels 62 which extend between sealed upper chamber 48 and sealed lower chamber 54. As illustrated in the figures, vibration damping device 10 includes two fluid channels 62. Channel retainer 28 is an annular member which is molded into lower elastomeric spring 26 to provide support for fluid channels 62. Channel retainer 28 defines an attachment flange 64 which is formed over annular connector 14 during the assembly of vibration damping device 10. An upper port 66 formed through annular portion 46 of annular connector 14 allows communication between a respective fluid channel 62 and sealed upper chamber 48. As illustrated in the figures, vibration damping device 10 includes two upper ports 66. A lower port 68 formed through lower elastomeric spring 26 and channel retainer 28 allows communication between a respective fluid channel 62 and sealed lower chamber 54. As illustrated in the figures, vibration damping device 10 includes two lower ports 68. Thus, as illustrated in the figures, there are two communication passages between sealed upper chamber 48 and sealed lower chamber 54. Each communication passage is formed by a respective upper port 66, a respective fluid channel 62 and a respective lower port 68.

Sealed upper chamber 48 and sealed lower chamber 54 and fluid channels 62 are filled with a hydroelastic fluid 80. The damping characteristics for vibration damping device 10 are achieved by the resonance of the mass of hydroelastic fluid 80 in fluid channels 62. The very high damping characteristics of vibration damping device 10 are achieved by having sealed upper chamber 48 and sealed lower chamber 54 very large in relation to the package size and also by the positive pumping action of vibration damping device 10. In each direction of motion of vibration damping device 10 (up and down as illustrated in FIG. 2) one of sealed upper chamber 48 or sealed lower chamber 54 is raised to a higher pressure than the other chamber 48 or 54 leading to very effective pumping of the hydroelastic fluid 80 in fluid channels 62. FIG. 2 illustrates vibration damping device 10 in a free state and FIG. 3 illustrates vibration damping device 10 in a compressed state. It can be seen that as vibration damping device 10 is compressed, the load is supported by inner tube 12, inner ring 16 and annular connector 14. This load increases the pressure in sealed lower chamber 54 and lowers the pressure in sealed upper chamber 48 forcing hydroelastic fluid 80 from sealed lower chamber 54 through fluid channels 62 and into sealed upper chamber 48. In a similar manner, when vibration damping device 10 is extended, inner tube 12, inner ring 16 and annular connector 14 move upward increasing the pressure in sealed upper chamber 48 and decreasing the fluid pressure in sealed lower chamber 54 forcing hydroelastic fluid 80 from sealed upper chamber 48 through fluid channels 62 and into sealed lower chamber 54. In this way, hydroelastic fluid 80 in fluid channels 62 is made to resonate as the upper surface of inner tube 12 moves up and down in relation to the lower surface of bottom cup 20. While hydroelastic fluid 80 is described in conjunction with vibration damping device 10, it is within the scope of the present disclosure to utilize hydroelastic fluid 80 in any type of vibration damping device.

The tuning for vibration damping device 10 is accomplished by changing the number, changing the cross-sectional area, changing the length of fluid channels 62 and changing the type of hydroelastic fluid 80. Also, the design for ports 66 and 68 can be used to affect the tuning for vibration damping device 10.

Figure 4:
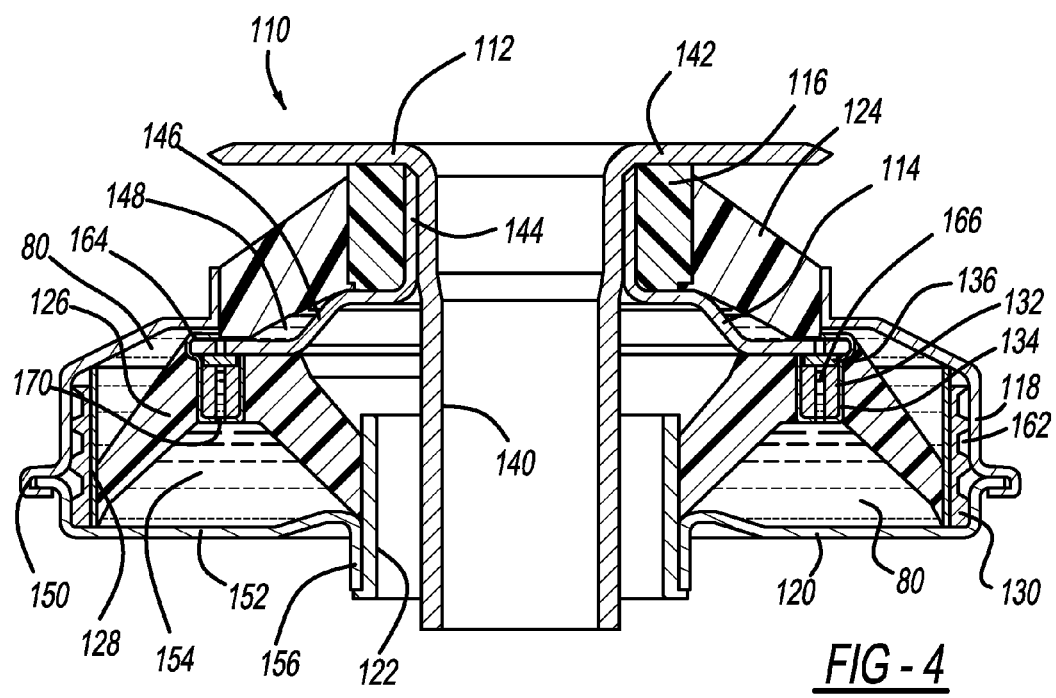
FIG. 4 is a side cross-sectional view of a vibration damping device in accordance with another embodiment of the present disclosure.

Referring now to FIG. 4, a vibration damping device in accordance with another embodiment of the present disclosure is indicated generally by the reference number 110. Vibration damping device 110 comprises an inner tube 112, an annular connector 114, an inner ring 116, an upper cup 118, a bottom cup 120, an outer tube 122, a first component illustrated as an upper elastomeric spring 124, a second component illustrated as a lower elastomeric spring 126, an outer ring 128, an annular channel ring 130, a channel retainer 132, an apertured ring 134 and a floating ring 136.

Inner tube 112 comprises a cylindrical portion 140 and an annular flange 142. The upper surface of annular flange 142 engages the upper component such as the engine, the vehicle body or the subframe being mounted to the lower component such as the frame or chassis of the vehicle. Cylindrical portion 140 is adapted to receive a mounting bolt for the bolt-through design for vibration damping device 110.

Annular connector 114 comprises a cylindrical portion 144 which engages cylindrical portion 140 of inner tube 112 and an annular portion 146 which forms a portion of a first chamber illustrated as a sealed upper chamber 148 as discussed below. Inner ring 116 is disposed around cylindrical portion 144 of annular connector 114 and is disposed between annular flange 142 of inner tube 112 and annular portion 146 of annular connector 114. Inner ring 116 helps to transfer the load of the upper component from inner tube 112 to annular connector 114 as discussed below. Inner tube 112, annular connector 114 and inner ring 116 define a first support member for the upper component.

Upper cup 118 is an annular member which encircles annular connector 114 to also form a portion of sealed upper chamber 148. Upper elastomeric spring 124 is bonded to the upper support member by being bonded to both inner ring 116 and upper cup 118 to complete the formation of sealed upper chamber 148. Upper cup 118 includes an attachment flange 150 which is formed around bottom cup 120 during the assembly of vibration damping device 110. Bottom cup 120 comprises an annular portion 152 which forms a portion of a second sealed chamber illustrated as a sealed lower chamber 154 and a cylindrical portion 156 which engages outer tube 122. The lower surface of bottom cup 120 engages the lower component to which the upper component is being attached. The lower end of outer tube 122 is formed over cylindrical portion 156 during the assembly of vibration damping device 110. Upper cup 118, bottom cup 120 and outer tube 122 define a second support member for the lower component.

Lower elastomeric spring 126 is bonded to the lower support member by being bonded to outer tube 122 and is also bonded to outer ring 128. Lower elastomeric spring 126 and outer ring 128 complete the formation of sealed lower chamber 154.

Annular channel ring 130 is disposed around outer ring 128 and annular channel ring 130 defines one or more fluid channels 162 which are disposed between sealed upper chamber 148 and sealed lower chamber 154. One end of each fluid channel 162 is open to sealed upper chamber 148 and the opposite end of each fluid channel 162 is open to sealed lower chamber 154 to allow fluid flow between sealed fluid chambers 148 and 154 as described below. Sealed upper chamber 148, sealed lower chamber 154 and fluid channels 162 are filled with hydroelastic fluid 80.

Channel retainer 132 is an annular member which is molded into lower elastomeric spring 126. Channel retainer 132 defines an attachment flange 164 which is formed over annular connector 114 during the assembly of vibration damping device 110. Apertured ring 134 is inserted into channel retainer 132. Apertured ring 134 defines a plurality of apertures 166 extending through apertured ring 134. Apertures 166 are circumferentially spaced around apertured ring 134 and each aperture 166 can be a different diameter in order to tune vibration damping device 110. As illustrated in FIG. 4, two diametrically opposed apertures 166 have the same relatively small diameter and are sized to provide a relatively stiff damping. The two diametrically opposed apertures 166 located ninety degrees from apertures 166 illustrated in FIG. 5 has a relatively large diameter which would then provide a relatively soft damping in that radial direction as described below.

Figure 5:
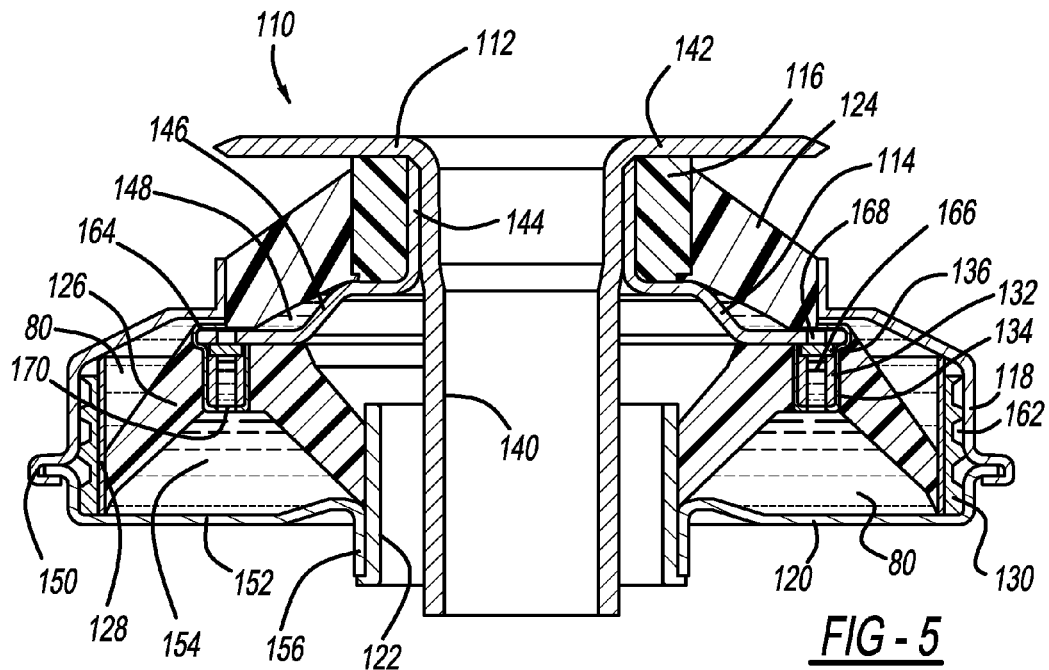
FIG. 5 is a side cross-sectional view of the vibration damping device shown in FIG. 4 taken in a plane 90° to the plane illustrated in FIG. 4.

Floating ring 136 is located adjacent apertured ring 134 and it is allowed to move axially with respect to apertured ring 134 to allow hydroelastic fluid 80 to flow through apertures 166 for small amplitudes of motion for vibration damping device 110. Annular portion 146 of annular connector 114 defines one or more fluid apertures 168 and channel retainer 132 defines one or more fluid apertures 170 which in conjunction with apertures 166 will allow hydroelastic fluid 80 to flow between sealed fluid chambers 148 and 154. The fluid flow of hydroelastic fluid 80 between sealed fluid chambers 148 and 154 through apertures 166, 168 and 170 is controlled by floating ring 136. For small compression and extension movements of vibration damping device 110, hydroelastic fluid 80 will flow relatively unrestricted between sealed fluid chambers 148 and 154. The amount of movement for relatively unrestricted fluid flow of hydroelastic fluid 80 through apertures 166, 168 and 170 will be determined by the axial movement of floating ring 136. Floating ring 136 moves axially upward to seal against annular portion 146 of annular connector 114 to close apertures 168 and floating ring 136 moves axially downward to seal against apertured ring 134 to seal apertures 166. The amount of axial movement of floating ring 136 between apertured ring 134 and annular portion 146 of annular connector 114 determines the amount of relatively unrestricted flow of hydroelastic flow 80. In this way, the high frequency vibration characteristics of vibration damping device 110 are tuned to have a lower stiffness and better isolation of noise and vibration. The high frequency characteristics for vibration damping device 110 can be tuned by selecting hydroelastic fluid 80 and by selecting the number and diameter of apertures 166 and 168. As illustrated in FIG. 4, relatively small apertures 166 are selected to provide a relatively stiff characteristic in the chosen plane. As illustrated in FIG. 5, relatively large apertures 166 are selected to provide a relatively soft characteristic in the chosen plane.

The low frequency damping characteristics for vibration damping device 110 are achieved by the resonance of the mass of hydroelastic fluid 80 in fluid channels 162. The very high damping characteristics for vibration damping device 110 are achieved by having sealed upper chamber 148 and sealed lower chamber 154 very large in relation to the package size and also by the positive pumping action of vibration damping device 110. In each direction of motion of vibration damping device 110 (up and down as illustrated in FIG. 4) one of sealed upper chamber 148 or sealed lower chamber 154 is raised to a higher pressure than the other chamber 148 or 154 leading to very effective pumping of the hydroelastic fluid 80 in fluid channels 162. It can be seen that as vibration damping device 110 is compressed, the load is supported by inner tube 112, inner ring 116 and annular connector 114. This load increases the pressure in sealed lower chamber 154 and lowers the pressure in sealed upper chamber 148 forcing hydroelastic fluid 80 from sealed lower chamber 154 through fluid channels 162 and into sealed upper chamber 148. In a similar manner, when vibration damping device 110 is extended, inner tube 112, inner ring 116 and annular connector 114 move upward increasing the pressure in sealed upper chamber 148 and decreasing the fluid pressure in sealed lower chamber 154 forcing hydroelastic fluid 80 from sealed upper chamber 148 through fluid channels 162 and into sealed lower chamber 154. In this way, hydroelastic fluid 80 in fluid channels 162 is made to resonate as the upper surface of inner tube 112 moves up and down in relation to the lower surface of bottom cup 120.

The tuning for vibration damping device 110 is accomplished by selecting hydroelastic fluid 80 and by changing the number, changing the cross-sectional area and changing the length of fluid channels 162. Also, the design for the openings to sealed fluid chambers 148 and 154 can be used to affect the tuning for vibration damping device 110.

Figure 6:
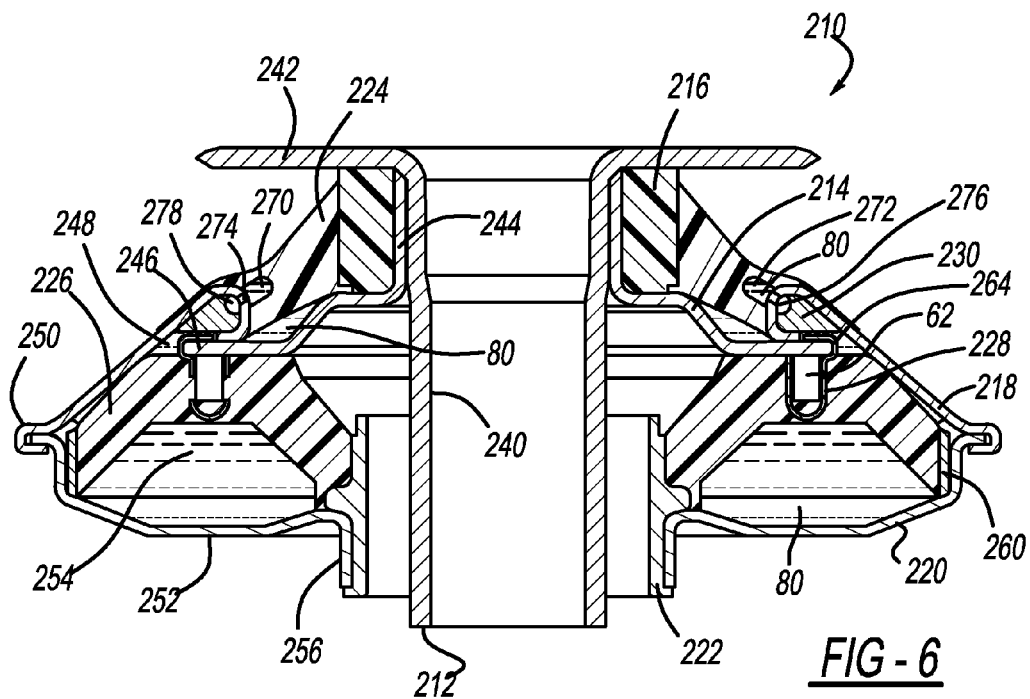
FIG. 6 is a side cross-sectional view of a vibration damping device in accordance with another embodiment of the present disclosure.

Referring now to FIG. 6, a vibration damping device in accordance with another embodiment of the present disclosure is indicated generally by the reference numeral 210. Vibration damping device 210 comprises an inner tube 212, an annular connector 214, an inner ring 216, an upper cup 218, a bottom cup 220, an outer tube 222, a first component illustrated as an upper elastomeric spring 224, a second component illustrated as a lower elastomeric spring 226, a channel retainer 228 and a channel ring 230.

Inner tube 212 comprises a cylindrical portion 240 and an annular flange 242. The upper surface of annular flange 242 engages and supports the upper component such as the engine, the vehicle body or the subframe being mounted to the lower component such as the frame or chassis of the vehicle. Cylindrical portion 240 is adapted to receive a mounting bolt for the bolt-through design for vibration damping device 210.

Annular connector 214 comprises a cylindrical portion 244 which engages cylindrical portion 240 of inner tube 212 and an annular portion 246 which forms a portion of a first chamber illustrated as a sealed upper chamber 248 as discussed below. Inner ring 216 is disposed around cylindrical portion 244 of annular connector 214 and is disposed between annular flange 242 of inner tube 212 and annular portion 246 of annular connector 214. Inner ring 216 helps to transfer the load of the upper component from inner tube 212 to annular connector 214 as discussed below. Inner tube 212, annular connector 214 and inner ring 216 define a first support member for the upper component.

Upper cup 218 is an annular member which encircles annular connector 214 to also form a portion of sealed upper chamber 248. Upper elastomeric spring 224 is bonded to the upper support member by being bonded to both inner ring 216 and upper cup 218 to complete the formation of sealed upper chamber 248. Upper cup 218 includes an attachment flange 250 which is formed around bottom cup 220 during the assembly of vibration damping device 210. Bottom cup 220 comprises an annular portion 252 which forms a portion of a second chamber illustrated as a sealed lower chamber 254 and a cylindrical portion 256 which engages outer tube 222. The lower surface of bottom cup 220 engages and supports the lower component to which the upper component is being attached. The lower end of outer tube 222 is formed over cylindrical portion 256 of bottom cup 220 during the assembly of vibration damping device 210. Upper cup 218, bottom cup 220 and outer tube 222 define a second support member for the lower component.

Lower elastomeric spring 226 is bonded to the lower support member by being bonded to outer tube 222 and is also bonded to a retention ring 260 which engages bottom cup 220. Lower elastomeric spring 226 completes the formation of sealed lower chamber 254. Lower elastomeric spring 226 defines the one or more fluid channels 62 which extend between sealed upper chamber 248 and sealed lower chamber 254. Similar to vibration damping device 10, vibration damping device 210 includes two fluid channels 62. Channel retainer 228 is an annular member which is molded into lower elastomeric spring 226 to provide support for fluid channels 62. Channel retainer 228 defines an attachment flange 264 which is formed over annular connector 214 during the assembly of vibration damping device 210. Upper port 66 formed through annular portion 246 of annular connector 214 allows communication between a respective fluid channel 62 and sealed upper chamber 248. Similar to vibration damping device 10, vibration damping device 210 includes the two upper ports 66. Lower port 68 formed through lower elastomeric spring 226 and channel retainer 228 allows communication between a respective fluid channel 62 and sealed lower chamber 254. Similar to vibration damping device 10, vibration damping device 210 includes two lower ports 68. Thus, as illustrated in the figures, there are two communication passages between sealed upper chamber 248 and sealed lower chamber 254. Each communication passage is formed by a respective upper port 66, a respective fluid channel 62 and a respective lower port 68.

Sealed upper chamber 248 and sealed lower chamber 254 and fluid channels 62 are filled with hydroelastic fluid 80. The damping characteristics for vibration damping device 210 are achieved by the resonance of the mass of hydroelastic fluid 80 in fluid channels 62. The very high damping characteristics of vibration damping device 210 are achieved by having sealed upper chamber 248 and sealed lower chamber 254 very large in relation to the package size and also by the positive pumping action of vibration damping device 210. In each direction of motion of vibration damping device 210 (up and down as illustrated in FIG. 6) one of sealed upper chamber 248 or sealed lower chamber 254 is raised to a higher pressure than the other chamber 248 or 254 leading to very effective pumping of hydroelastic fluid 80 in fluid channels 62. The flow of hydroelastic fluid 80 for vibration damping device 210 is the same as described above for vibration damping device 10.

Referring now to FIG. 6, channel ring 230 is disposed within sealed upper chamber 248 and is attached to upper cup 218 by having the end of upper cup 218 formed over channel ring 230 during the assembly of vibration damping device 210. Channel ring 230 provides for the radial damping by vibration damping device 210 which is in addition to the axial damping described above.

Upper elastomeric spring 224 defines a first chamber 270 and a second chamber 272 circumferentially spaced from first chamber 270. FIG. 6 illustrates a one-hundred eighty degree circumferential spacing for first and second chambers 270 and 272 for purposes of illustration. It is within the scope of the present disclosure to have a different spacing for chambers 270 and 272 and also to have more than two interconnecting chambers if the tuning of vibration damping device 210 requires it.

As illustrated, upper cup 218 defines a first port 274 opening into first chamber 270 and a second port 276 opening into second chamber 272. Channel ring 230 defines a fluid channel 278 which extends between first port 274 and second port 276. Thus, first chamber 270 is in communication with second chamber 272 through first port 274, fluid channel 278 and second port 276. First chamber 270, second chamber 272 and fluid channel 278 are filled with hydroelastic fluid 80.

During axial compression or extension of vibration damping device 210, both chambers 270 and 272 will be compressed or extended since the upper elastomeric spring 224 is attached to inner ring 216 which moves with inner tube 212 and upper elastomeric spring 224 is also attached to upper cup 218 which moves with bottom cup 220. In this mode, there will be no movement of hydroelastic fluid 80 within chambers 270 and 272 or the fluid within fluid channel 278 and therefore there will be no fluid flow of hydroelastic fluid 80 or damping.

When inner tube 212 moves in a radial direction with respect to bottom cup 220, hydroelastic fluid 80 will be forced from chamber 270 to chamber 272 or from chamber 272 to chamber 270 depending on the radial direction. This flow of hydroelastic fluid 80 through fluid channel 278 is made to resonate as vibration damping device 210 vibrates from side to side and thus produces a damping load.

The tuning for vibration damping device 210 in the radial direction is accomplished by selecting the hydroelastic fluid 80, changing the number, changing the cross-sectional area and changing the length of fluid channels 278. Also, the design for ports 274 and 276 can be used to affect the tuning for vibration damping device 210.

Figure 7:
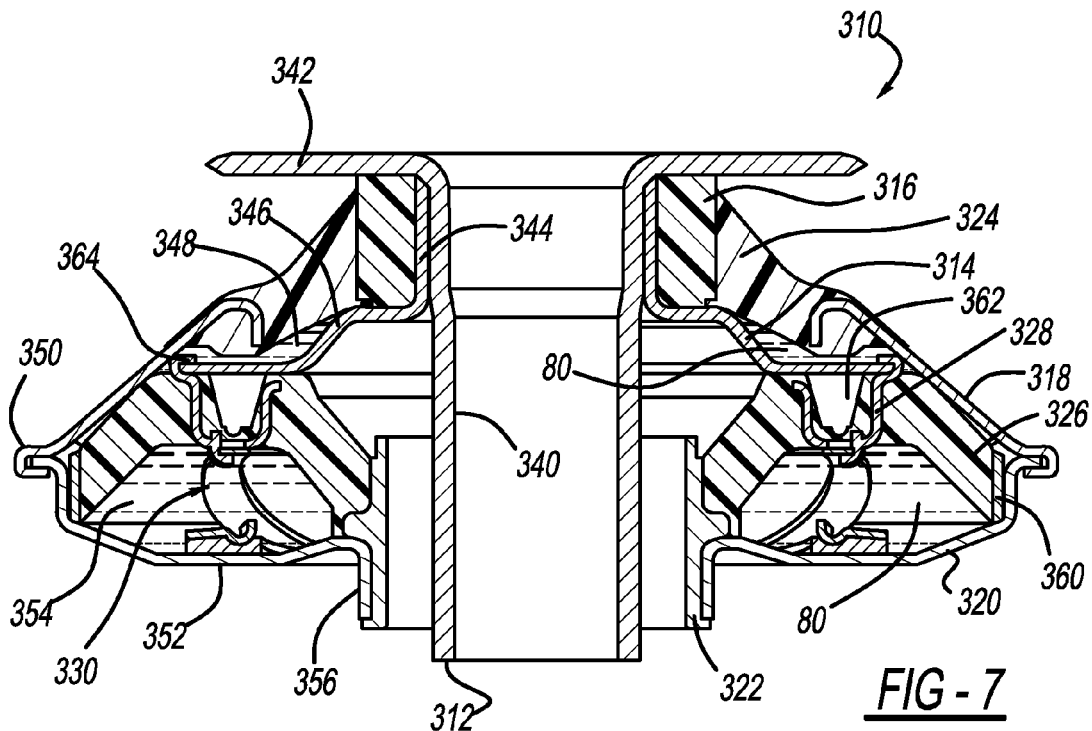
FIG. 7 is a side cross-sectional view of a vibration damping device in accordance with another embodiment of the present disclosure.
Figure 8:
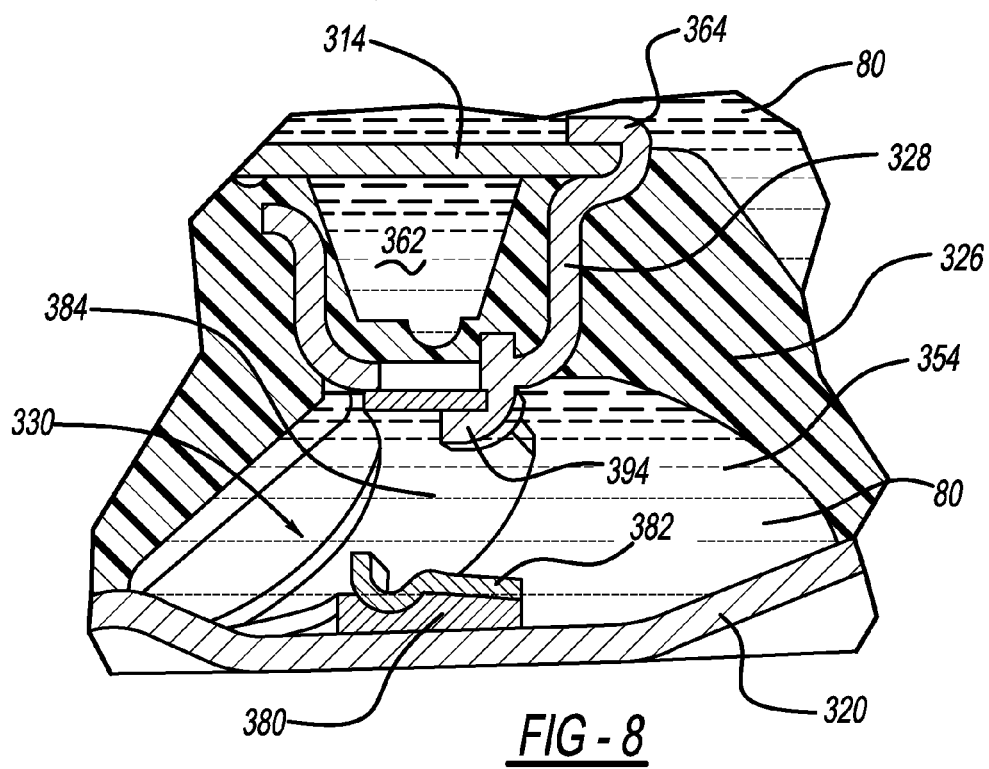
FIG. 8 is an enlarged cross-sectional view of the vibration damping device illustrating the frictional biasing member.
Figure 9:
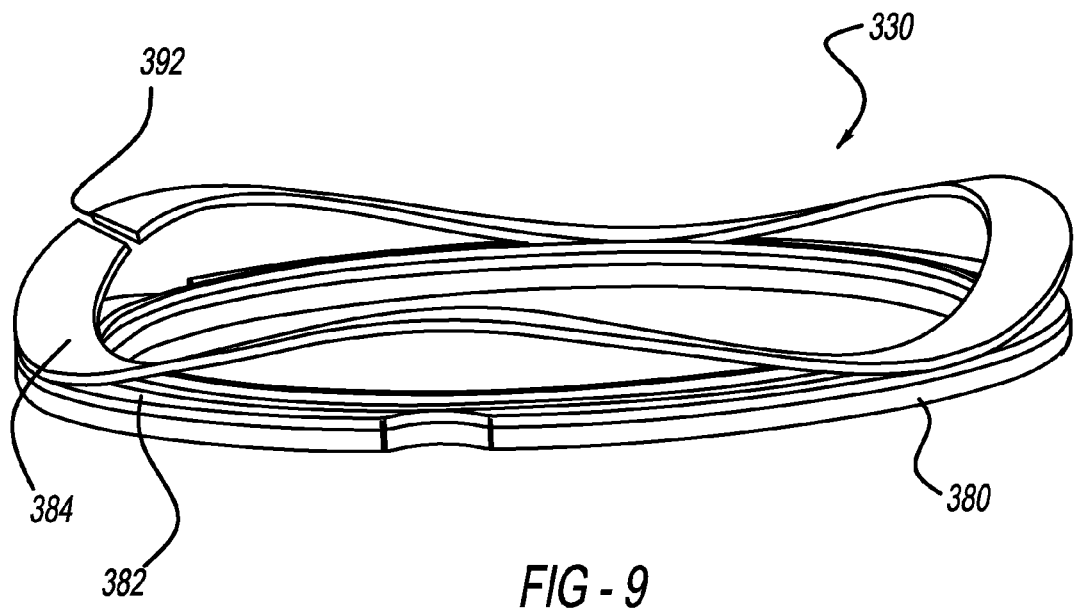
FIG. 9 is a perspective view of the frictional biasing member illustrated in FIGS. 7 and 8.
Figure 10:
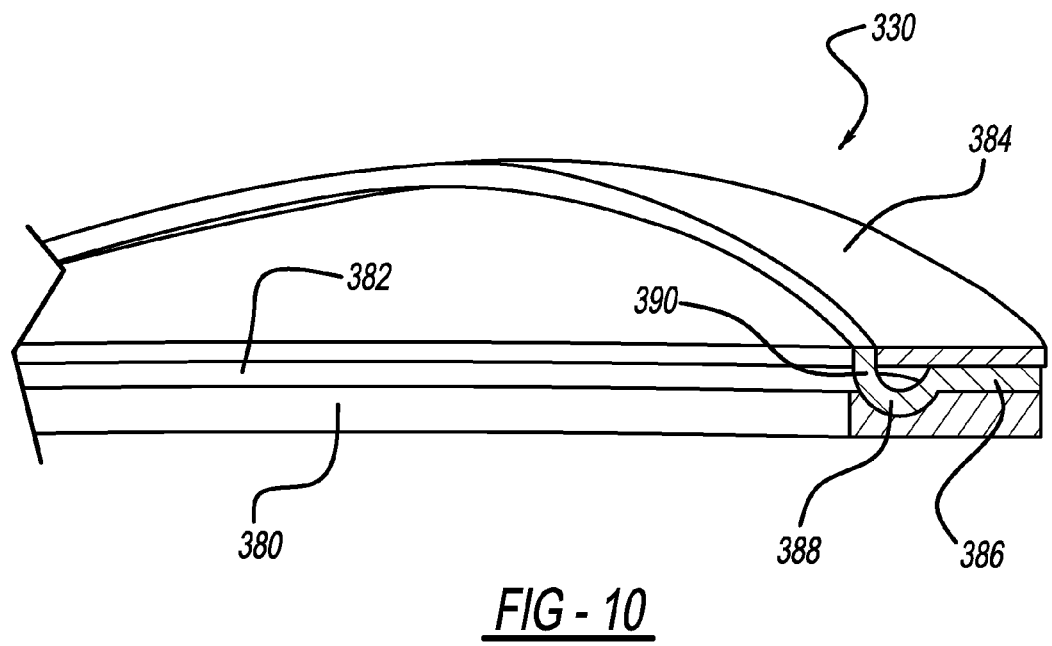
FIG. 10 is a perspective view, partially in cross-section of the frictional biasing member illustrated in FIGS. 7 and 8.

Referring now to FIGS. 7-9 a vibration damping device in accordance with another embodiment of the present disclosure is indicated generally by the reference numeral 310. Vibration damping device 310 comprises an inner tube 312, an annular connector 314, and inner ring 316, an upper cup 318, a bottom cup 320, an outer tube 322, a first component illustrated as an upper elastomeric spring 324, a second component illustrated as a lower elastomeric spring 326, a channel retainer 328 and a frictional biasing member 330.

Inner tube 312 comprises a cylindrical portion 340 and an annular flange 342. The upper surface of annular flange 342 engages and supports the upper component such as the engine, the vehicle body or the subframe being mounted to the lower component such as the frame or chassis of the vehicle. Cylindrical portion 340 is adapted to receive a mounting bolt for the bolt-through design for vibration damping device 310.

Annular connector 314 comprises a cylindrical portion 344 which engages cylindrical portion 340 of inner tube 312 and an annular portion 346 which forms a portion of a first chamber illustrated as a sealed upper chamber 348 as discussed below. Inner ring 316 is disposed around cylindrical portion 344 of annular connector 314 and is disposed between annular flange 342 of inner tube 312 and annular portion 346 of annular connector 314. Inner ring 316 helps to transfer the load of the upper component from inner tube 312 to annular connector 314 as discussed below. Inner tube 312, annular connector 314 and inner ring 316 define a first support member for the upper component.

Upper cup 318 is an annular member which encircles annular connector 314 to also form a portion of sealed upper chamber 348. Upper elastomeric spring 324 is bonded to the upper support member by being bonded to both inner ring 316 and upper cup 318 to complete the formation of sealed upper chamber 348. Upper cup 318 includes an attachment flange 350 which is formed around bottom cup 320 during the assembly of vibration damping device 310. Bottom cup 320 comprises an annular portion 352 which forms a portion of a second chamber illustrated as a sealed lower chamber 354 and a cylindrical portion 356 which engages outer tube 322. The lower surface of annular portion 352 of bottom cup 320 engages and supports the lower component to which the upper component is being attached. The lower end of outer tube 322 is formed over cylindrical portion 356 of bottom cup 320 during the assembly of vibration damping device 310. Upper cup 318, bottom cup 320 and outer tube 322 define a second support member for the lower component.

Lower elastomeric spring 326 is bonded to the lower support member by being bonded to outer tube 322 and is also bonded to a retention ring 360 which engages bottom cup 320. Lower elastomeric spring 326 completes the formation of sealed lower chamber 354. Lower elastomeric spring 326 defines one or more fluid channels 362 which extend between sealed upper chamber 348 and sealed lower chamber 354. Similar to what is illustrated in FIG. 1, vibration damping device 310 includes two fluid channels 362. Channel retainer 328 is an annular member which is molded into lower elastomeric spring 326 to provide support for fluid channels 362. Channel retainer 328 defines an attachment flange 364 which is formed over annular connector 314 during the assembly of vibration damping device 310. An upper port 366 formed through annular portion 346 of annular connector 314 allows communication between a respective fluid channel 362 and sealed upper chamber 348. Similar to what is illustrated in FIG. 1, vibration damping device 310 includes two upper ports 366. A lower port 368 formed through lower elastomeric spring 326 and channel retainer 328 allows communication between a respective fluid channel 362 and sealed lower chamber 354. Similar to what is illustrated in FIG. 1, vibration damping device 310 includes two lower ports 368. Thus, as illustrated in FIG. 1 which also applies to FIG. 7, there are two communication passages between sealed upper chamber 348 and sealed lower chamber 354. Each communication passage is formed by a respective upper port 366, a respective fluid channel 362 and a respective lower port 368.

Sealed upper chamber 348 and sealed lower chamber 354 and fluid channels 362 are filled with hydroelastic fluid 80. The axial damping characteristics for vibration damping device 310 are achieved by the resonance of the mass of hydroelastic fluid 80 in fluid channels 362. The very high axial damping characteristics of vibration damping device 310 are achieved by having sealed upper chamber 348 and sealed lower chamber 354 very large in relation to the package size and also by the positive pumping action of vibration damping device 310. In each direction of motion of vibration damping device 310 (up and down as illustrated in FIG. 7) one of sealed upper chamber 348 or sealed lower chamber 354 is raised to a higher pressure than the other chamber 348 or 354 leading to very effective pumping of hydroelastic fluid 80 in fluid channels 362. FIG. 7 illustrates vibration damping device 310 in a free state. Similar to FIG. 3, when vibration damping device 310 is compressed, the load is supported by inner tube 312, inner ring 316 and annular connector 314. This load increases the pressure in sealed lower chamber 354 and lowers the pressure in sealed upper chamber 348 forcing hydroelastic fluid 80 from sealed lower chamber 354 through fluid channels 362 and into sealed upper chamber 348. In a similar manner, when vibration damping device 310 is extended, inner tube 312, inner ring 316 and annular connector 314 move upward increasing the pressure in sealed upper chamber 348 and decreasing the fluid pressure in sealed lower chamber 354 forcing hydroelastic fluid 80 from sealed upper chamber 348 through fluid channels 362 and into sealed lower chamber 354. In this way, hydroelastic fluid 80 in fluid channels 362 is made to resonate as the upper surface of inner tube 312 moves up and down in relation to the lower surface of bottom cup 320.

The tuning for vibration damping device 310 is accomplished by selecting the hydroelastic fluid 80, changing the number, changing the cross-sectional area and changing the length of fluid channels 362. Also, the design for ports 366 and 368 can be used to affect the tuning for vibration damping device 310.

Frictional biasing member 330 is an annular component which comprises a friction ring 380, a support ring 382 and a wavy washer or spring 384. While friction ring 380 and support ring 382 are illustrated as separate components, it is within the scope of the present invention to make friction ring 380 and support ring 382 a single integral component if the material used for the frictional material has sufficient strength to allow for the single integral component.

Friction ring 380 is an annular ring made of a friction material. Friction ring 380 is urged against bottom cup 320 by wavy washer or spring 384 as discussed below. Support ring 382 is an annular ring that engages and supports friction ring 380. Support ring 382 includes a generally planar section 386, an arcuate section 388 and an annular ring section 390. Planar section 386 engages a mating planar section on friction ring 380 and arcuate section 388 engages a mating arcuate groove formed in friction ring 380. The engagement between arcuate section 388 and the mating arcuate groove in friction ring 380 prohibits radial or sideways movement of friction ring 380 with respect to support ring 382. Annular ring section 390 extends upward or away from friction ring 380 at the inner diameter of support ring 382. Annular ring section 390 is engaged by wavy washer or spring 384 to prevent radial or sideways movement of support ring 382 with respect to wavy washer or spring 384 as discussed below. While friction ring 380 and support ring 382 are illustrated as two separate components, it is within the scope of the present disclosure to combine friction ring 380 and support ring 382 into a single homogenous component made from a friction material made of sufficient strength to properly function in vibration damping device 310. Also, support ring 382 may be bonded to friction ring 380.

Wavy washer or spring 384 is an annular component having a gap or split 392 which thus forms a generally C-shaped component. Wavy washer or spring 384 is designed to clip over the outer diameter of annular ring section 390 of support ring 382. The gap or split 392 allows for the diametric expansion of wavy washer or spring 384 allowing for it to be clipped over annular ring section 390 and to be held in place by the frictional engagement between wavy washer or spring 384 and annular ring section 390 of support ring 382. The engagement between the inside diameter of wavy washer or spring 384 and annular ring section 390 prohibits radial or sideways movement of wavy washer or spring 384 with respect to support ring 382 and friction ring 380.

During the assembly of vibration damping device 310, frictional biasing member 330, including friction ring 380, support ring 382 and wavy washer or spring 384, is secured to channel retainer 328 by a plurality of tabs 394. Tabs 394 are formed as part of channel retainer 328 and they are curled over as illustrated in FIG. 8 to secure wavy washer or spring 384, and thus frictional biasing member 330, to channel retainer 328. The engagement between tabs 394 and wavy washer or spring 384 prevents radial or sideways movement of frictional biasing member 330 with respect to channel retainer 328 and thus vibration damping device 310 since channel retainer 328 is secured to annular connector 314 which is secured to inner tube 312.

When the assembly of vibration damping device 310 is complete, frictional biasing member 330 is disposed between channel retainer 328 and bottom cup 320 in sealed lower chamber 354. When vibration damping device 310 is in its unloaded condition, as illustrated in FIG. 7, wavy washer or spring 384 is compressed by a specified amount to exert a specified load to urge friction ring 380 into engagement with bottom cup 320. Once vibration damping device 310 is installed into its application, compression of vibration damping device 310, movement of annular flange 342 of inner tube 312 toward annular portion 352 of bottom cup 320, will further compress wavy washer or spring 384 increasing the load urging friction ring 380 into engagement with bottom cup 320 to a specified working load at the installed height of vibration damping device 310.

During radial or sideways movement bottom cup 320 in any radial direction, with respect to inner tube 312, a sliding movement will occur between friction ring 380 and bottom cup 320. This sliding movement will be resisted by the frictional engagement between friction ring 380 and bottom cup 320 and this frictional engagement will generate a friction force which will dampen the radial or sideways movement of the structure supported by bottom cup 320 and the structure supported by inner tube 312. This radial damping is in addition to the axial damping discussed above and this combination provides the advantages of improving the ride/handling of a body or cab supported by vibration damping device 310. Vibration damping device 310 is a low cost solution to providing radial or sideways damping in any radial direction and the friction surfaces are located inside of vibration damping device 310 thus protected from the outside environment. In addition, the friction surfaces are disposed within sealed lower chamber 354 which is typically filled with a hydraulic fluid which lubricates the frictional surfaces and leads to a more predictable friction/damping force.

Hydroelastic fluid 80 is a fluid which has a fluid density in the range of 1.25 g/cm$^3$ to 2.2 g/cm$^3$; a fluid viscosity below 10 cSt @ 20° C., preferably below 5 cSt @ 20° C. and most preferably below 1 cSt @ 20° C.; and a fluid surface tension below 40 dynes @ 20° C., preferably below 30 dynes @ 25° C., and most preferably below 20 dynes @ 25° C. Fluids with the above listed properties are believed to allow the fluid filled vibration damping devices to have larger amounts of damping and allow the devices to have resonant frequencies that were impossible to obtain using the current state of art fluids.

Listed below are three fluid categories that meet the above listed properties and thus they may be able to be utilized in the new applications.

Category 1) Aqueous brines from the pavement deicing industries. A very popular runway deicer is 50% potassium acetate water solution. This fluid is used in the air travel industry as a preventative deicer that is applied to the tarmac to prevent snow and ice formation during winter. These fluids have the following properties that make them an ideal candidate for fluid filled vibration devices.

| TYPICAL PROPERTIES | |
|---|---|
| Appearance | Clear Blue Liquid |
| Odor | Mild, Characteristic |
| Specific Gravity | 1.282 |
| Pounds Per Gallon | 10.7 |
| Flash Point, COC | None |
| Water Miscibility | Complete |
| Freezing Point | −76° F.(−60° C.) |
| BOD (5-Day), g/g | 0.25 |
| TOD, g/g | 0.35 |
| Viscosity @ 20° C., cSt | 6.0 |
| Boil Point | 113° C. |

Category 2) Fluorine based heat transfer fluids. Within the semiconductor industry, fluorine based fluids are used for heat transfer during many of the silicone die manufacturing operations. These fluids have the following properties that make them an ideal candidate for fluid filled vibration devices.

| TYPICAL PROPERTIES | |
|---|---|
| Appearance | Clear, colorless |
| Average Molecular Weight | 521 |
| Boiling Point | (1 atm) 128° C. |
| Pour Point | −50° C. |
| Vapor Pressure | $1.44 \times 10^3$ pascals |
| Latent Heat of Vaporization (at normal boiling point) | 78 J/g |
| Liquid Density | 1820 kg/m$^3$ |
| Kinematic Viscosity | 0.75 centistokes |
| Absolute Viscosity | 1.4 centipoise |
| Liquid Specific Heat | 1100 J kg$^{-1}$ ° C.$^{-1}$ |
| Liquid Thermal Conductivity | 0.066 W m$^{-1}$° C.$^{-1}$ |
| Coefficient of Expansion | 0.0014° C.$^{-1}$ |
| Water Solubility | 7 ppmw |
| Solubility in Water | <5 ppmw |
| Ozone Depletion Potential | 0 |
| Dielectric Strength | 43 kV, 0.1" gap |
| Dielectric Constant | 1.89 |
| Electrical Resistivity | $5 \times 10^{15}$ ohm cm |

Category 3) Within the oil exploration industry, drilling muds and fluids have become mandatory for High Temperature High Pressure (HTHP) deep sea oil exploration. These fluids have a high specific gravity of about 2.2 g/cm$^3$ and are relatively low cost fluids. Cesium formate is believed to be the most favorable drilling fluid for use in fluid filled vibration damping devices. These fluids have the following properties that make them an ideal candidate for fluid filled vibration devices.

| TYPICAL PROPERTIES | |
|---|---|
| Appearance | Clear liquid |
| Color | Colorless |

-continued

| TYPICAL PROPERTIES | |
|---|---|
| Viscosity (CP) | |
| @ 26.7° C. | 6.7 |
| @ 37.8° C. | 4.6 |
| @ 71.0° C. | 3.0 |
| pH (buffered) | 10.0-11.0 |
| Dissociation Constant (pKa) | 3.75 |
| Vapor Pressure (Pa) (for 2.28 s.g. CsFo brine) | |
| @ 20° C. | 483 |
| @ 30° C. | 1042 |
| @ 40° C. | 1911 |
| Boiling Point (° C.) | 131 |
| Coefficient of Thermal Conductivity (W/m/K) | |
| @ 10° C. | 0.338 |
| @ 70° C. | 0.368 |
| Heat Capacity (J/g/K) | |
| @ 10° C.-70° C. | 1.38 |
| Coefficient Of Friction @ 93° C. | |
| metal-to-metal | 0.166 |
| metal-to-sandstone | 0.151 |

These fluids have an increased specific gravity and a lower viscosity than the current state of the art glycol based fluids. This allows for the design of fluid filled vibration devices having an increased amount of damping within a given geometry and the ability to design smaller fluid filled vibration devices that give the same level of damping as the larger fluid filled vibration devices utilizing glycol based fluids.

Figure 11:
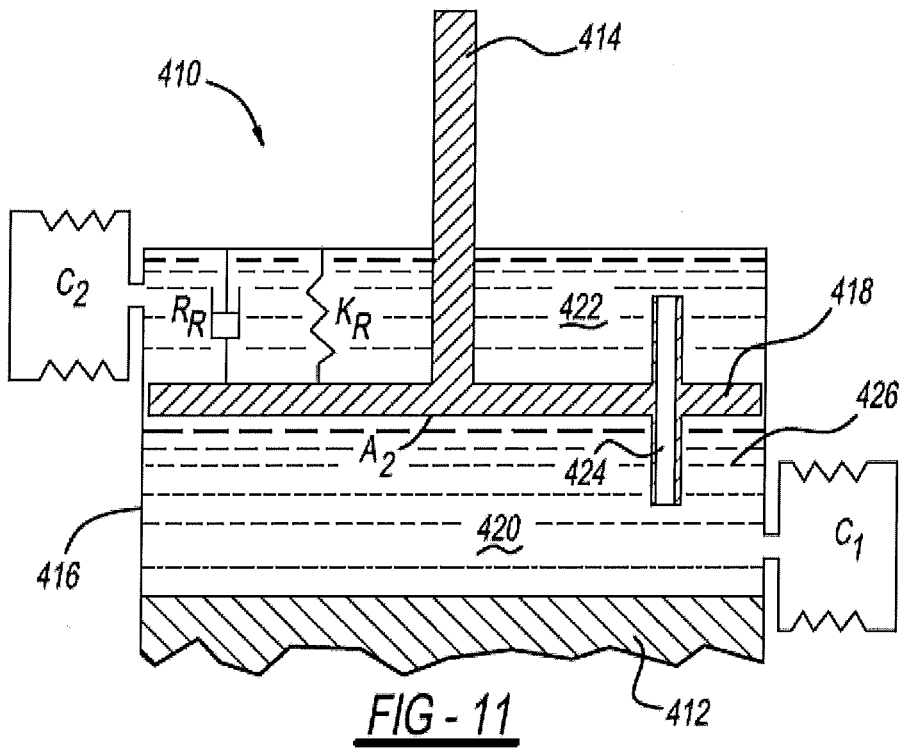
FIG. 11 is a schematic view of a generic hydroelastic device.

Referring now to FIG. 11, a generic hydroelastic device 410 is illustrated. Hydroelastic device 410 includes a first support member 412, a second support member 414, a first component 416 disposed between the first and second support members 412, 414 and a second component 418 disposed between the first and second support members 412, 414.

A first chamber 420 is defined by first component 416 and second component 418. A second chamber 422 is formed between second component 418 and first component 416. A channel 424 extends between first chamber 420 and second chamber 422. A fluid 426 is disposed within first chamber 420, second chamber 422 and channel 424.

During movement of second component 418 with respect to first component 416, fluid 426 moves between first and second chamber 420, 422 through channel 424. The damping characteristics for hydroelastic device 410 are determined using various factors which include the first chamber compliance $C_1$, the second chamber compliance $C_2$, the damping of the elastomeric components $R_R$, the spring rate of the elastomeric components $K_R$, the area of second component 418 $A_2$, and the inertia of fluid 426 in channel 424 $I_F$.

Figure 12:
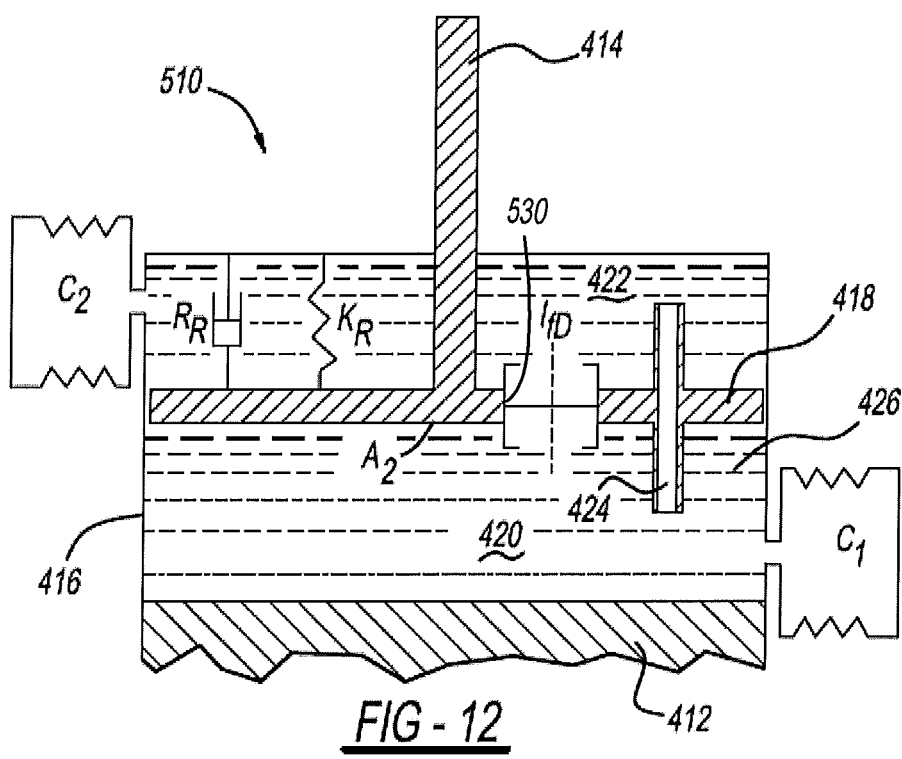
FIG. 12 is a schematic view of a generic hydraulic device in accordance with another embodiment of the present disclosure.

Referring now to FIG. 12, a generic hydroelastic device 510 is illustrated. Hydroelastic device 510 includes first support member 412, second support member 414, first component 416 disposed between the first and second support members 412, 414 and second component 418 disposed between the first and second support members 412, 414.

First chamber 420 is defined by first component 416 and second component 418. Second chamber 422 is formed between second component 418 and first component 416. Channel 424 extends between first chamber 420 and second chamber 422. A fluid decoupler 530 is disposed between first and second chambers 420, 422. Fluid 426 is disposed within first chamber 420, second chamber 422 and channel 424.

During movement of second component 418 with respect to first component 416, fluid 426 moves between first and second chamber 420, 422 through channel 424. The damping characteristics for hydroelastic device 510 are determined using various factors which include the first chamber compliance $C_1$, the second chamber compliance $C_2$, the damping of the elastomeric components $R_R$, the spring rate of the elastomeric components $K_R$, the area of second component 418 $A_2$, the inertia of fluid 426 in channel 424 $I_F$, and the inertia in fluid decoupler 530 $I_{FD}$.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vibration damping device comprising:
a first support member;
a second support member;
a first component disposed between the first support member and the second support member;
a second component disposed between the first support member and the second support member;
a first chamber defined by said first component;
a second chamber defined by said second component;
a channel extending between the first chamber and the second chamber; and
a hydroelastic fluid disposed within said first chamber, said second chamber and said channel, wherein the hydroelastic fluid includes at least one of aqueous brine, a fluorine based fluid and a cesium formate fluid; and wherein
said fluid has a fluid density of 1.25 g/cm³ to 2.2 g/cm³.

2. The vibration damping device according to claim 1, wherein said fluid has a fluid viscosity below 5 cSt @ 20° C.

3. The vibration damping device according to claim 2, wherein said fluid has a fluid surface tension below 40 dynes @ 20° C.

4. The vibration damping device according to claim 2, wherein said fluid has a fluid surface tension below 30 dynes @ 25° C.

5. The vibration damping device according to claim 2, wherein said fluid has a fluid surface tension below 20 dynes @ 25° C.

6. The vibration damping device according to claim 1, wherein said fluid has a fluid viscosity below 1 cSt @ 20° C.

7. The vibration damping device according to claim 6, wherein said fluid has a fluid surface tension below 40 dynes @ 20° C.

8. The vibration damping device according to claim 6, wherein said fluid has a fluid surface tension below 30 dynes @ 25° C.

9. The vibration damping device according to claim 6, wherein said fluid has a fluid surface tension below 20 dynes @ 25° C.

10. The vibration damping device according to claim 1, wherein said fluid has a fluid surface tension below 40 dynes @ 20° C.

11. The vibration damping device according to claim 1, wherein said fluid has a fluid surface tension below 30 dynes @ 25° C.

12. The vibration damping device according to claim 1, wherein said fluid has a fluid surface tension below 20 dynes @ 25° C.

13. The vibration damping device according to claim 1, wherein said fluid has a fluid surface tension below 40 dynes @ 20° C.

14. The vibration damping device according to claim 1, wherein said fluid has a fluid surface tension below 30 dynes @ 25° C.

15. The vibration damping device according to claim 1, wherein said fluid has a fluid surface tension below 20 dynes @ 25° C.

16. The vibration damping device according to claim 1, wherein said fluid is an aqueous brine.

17. The vibration damping device according to claim 1, wherein said fluid is a fluorine based fluid.

18. The vibration damping device according to claim 1, wherein said fluid is a cesium formate fluid.

19. A vibration damping device comprising:
a first support member;
a second support member;
a first component disposed between the first support member and the second support member;
a second component disposed between the first support member and the second support member;
a first chamber defined by said first component;
a second chamber defined by said second component;
a channel extending between the first chamber and the second chamber; and
a hydroelastic fluid disposed within said first chamber, said second chamber and said channel, and wherein the hydroelastic fluid includes at least one of aqueous brine, a fluorine based fluid, and a cesium formate fluid.

20. The vibration damping device of claim 19, wherein the hydroelastic fluid comprises a fluid viscosity below about 10 cSt @20° C.

* * * * *